US012768683B2

(12) United States Patent
Kinoshita et al.

(10) Patent No.: US 12,768,683 B2
(45) Date of Patent: Oct. 20, 2026

(54) MEASUREMENT APPARATUS, MEASUREMENT SYSTEM AND METHOD FOR SUPPLYING ELECTRICITY

(71) Applicant: HORIBA Advanced Techno, Co., Ltd., Kyoto (JP)

(72) Inventors: Wataru Kinoshita, Kyoto (JP); Kazuhiro Irie, Kyoto (JP)

(73) Assignee: HORIBA Advanced Techno, Co., Ltd., Kyoto (JP)

( * ) Notice: Subject to any disclaimer, the term of this patent is extended or adjusted under 35 U.S.C. 154(b) by 289 days.

(21) Appl. No.: 18/767,886

(22) Filed: Jul. 9, 2024

(65) Prior Publication Data

US 2025/0023347 A1 Jan. 16, 2025

(30) Foreign Application Priority Data

Jul. 12, 2023 (JP) ................................ 2023-114329

(51) Int. Cl.
*G01D 11/24* (2006.01)

(52) U.S. Cl.
CPC .................................... *G01D 11/24* (2013.01)

(58) Field of Classification Search
CPC ...................................................... G01D 11/24
See application file for complete search history.

(56) References Cited

U.S. PATENT DOCUMENTS 3,270,267 A * 8/1966 Nolte, Jr. .................. H02J 7/70 200/51.09
5,859,481 A * 1/1999 Banyas ................... H02J 7/342 307/64
6,150,796 A * 11/2000 Ford ....................... H02J 7/342 320/128
9,030,208 B2 * 5/2015 Shoykhet ............ G06F 13/4081 324/538
2014/0218045 A1 * 8/2014 Shoykhet ............ G06F 13/4081 702/58
2016/0187218 A1 * 6/2016 Ite ......................... G01L 13/025 73/717
2017/0141593 A1 * 5/2017 Chen ....................... H02J 7/685
2017/0170670 A1 * 6/2017 Shimura ............... G06F 1/1626
2019/0199101 A1 * 6/2019 Hennesy ................... B25F 5/02
2026/0142486 A1 * 5/2026 Chen ......................... H02J 7/42

FOREIGN PATENT DOCUMENTS

JP 2010060395 A 3/2010
WO WO-2025072046 A1 * 4/2025 ................ H02J 7/70

* cited by examiner

*Primary Examiner* — Nathaniel J Kolb
(74) *Attorney, Agent, or Firm* — Alleman Hall LLP

(57) ABSTRACT

At a measurement apparatus, a measurement gauge comprises a plurality of measurement terminals, a main body comprises a plurality of main body terminals that come in contact with the plurality of measurement terminals when the measurement gauge is installed with respect to the main body, and the measurement apparatus comprises a power supply unit that supplies electricity to the plurality of main body terminals, a detection unit that detects installation of the measurement gauge with respect to the main body; and a switching unit that, when the detection unit detects the installation of the measurement gauge with respect to the main body, causes electrical connection between the power supply unit and at least one of the plurality of main body terminals to be switched from a state in which electrical connection is blocked to a state in which electrical connection is made.

18 Claims, 9 Drawing Sheets

MEASUREMENT APPARATUS, MEASUREMENT SYSTEM AND METHOD FOR SUPPLYING ELECTRICITY

CROSS REFERENCE TO RELATED APPLICATIONS

This application claims the benefit of priority of Japanese application no. 2023-114329, filed on Jul. 12, 2023, which is incorporated herein by reference.

BACKGROUND OF THE INVENTION

Field of the Invention

The present application relates to a measurement apparatus, a measurement system and method for supplying electricity a measurement apparatus.

Description of the Related Art

Conventionally, a measurement apparatus might, for example, comprise a measurement gauge that measures a fluid, a main body with respect to which the measurement gauge is removably installable, and a power supply unit that supplies electricity to the measurement gauge (e.g., JP-A-2010-60395). At the measurement apparatus associated with JP-A-2010-60395, electric power from the power supply unit is supplied to the measurement gauge without being routed through the main body. It is, however, desired that electric power from the power supply unit be supplied to the measurement gauge by way of the main body.

The problem is therefore to provide a measurement apparatus, measurement system, and measurement apparatus power supply method capable of causing electric power from the power supply unit to be supplied to the measurement gauge by way of the main body.

SUMMARY OF THE INVENTION

There is provided a measurement apparatus comprising:

a measurement gauge that measures a fluid; and a main body with respect to which the measurement gauge is removably installable;

wherein the measurement gauge comprises a plurality of measurement terminals;

wherein the main body comprises a plurality of main body terminals that come in contact with the plurality of measurement terminals when the measurement gauge is installed with respect to the main body; and wherein the measurement apparatus comprises

- a power supply unit that supplies electricity to the plurality of main body terminals;
- a detection unit that detects installation of the measurement gauge with respect to the main body; and
- a switching unit that, when the detection unit detects the installation of the measurement gauge with respect to the main body, causes electrical connection between the power supply unit and at least one of the plurality of main body terminals to be switched from a state in which electrical connection is blocked to a state in which electrical connection is made.

There is provided a measurement system comprising:

the measurement apparatus; and a communication apparatus that is communicated with the measurement apparatus.

There is provided a method for supplying electricity to a measurement apparatus comprising a measurement gauge that measures a fluid, and a main body with respect to which the measurement gauge is removably installable, wherein the measurement gauge comprises a plurality of measurement terminals;

wherein the main body comprises a plurality of main body terminals that come in contact with the plurality of measurement terminals when the measurement gauge is installed with respect to the main body;

wherein the measurement apparatus comprises:

- a power supply unit that supplies electricity to the plurality of main body terminals;
- a detection unit that detects installation of the measurement gauge with respect to the main body; and
- a switching unit that, when the detection unit detects the installation of the measurement gauge with respect to the main body, causes electrical connection between the power supply unit and at least one of the plurality of main body terminals to be switched from a state in which electrical connection is blocked to a state in which electrical connection is made; and wherein the method for supplying electricity comprises installing the measurement gauge with respect to the main body so as to cause the plurality of measurement terminals and the plurality of main body terminals to come in contact.

DETAILED DESCRIPTION OF THE INVENTION

So as to, for example, facilitate understanding, dimensions of constituent elements at the respective drawings may be shown larger or smaller than their actual dimensions; furthermore, dimensional ratios are not necessarily consistent from drawing to drawing. Moreover, so as to, for example, facilitate understanding, constituent elements may be shown at the respective drawings in partially omitted fashion.

Where terminology including first, second, or other such ordinal numbers is used, this is done to describe a diverse variety of constituent elements; as such terminology is employed only for the purpose of distinguishing one constituent element from other constituent element(s), it should be understood that such terminology constitutes no particular limitation with respect to the constituent elements. Note, furthermore, with respect to the number of constituent element(s) which include ordinal number(s) that are present, there is no particular limitation with respect thereto, it being possible for there to be, for example, one thereof. Furthermore, ordinal number(s) employed below in the specification and drawings may differ from ordinal number(s) recited in the claims.

Below, embodiments of a measurement system and a measurement apparatus are described with reference to FIG. 1 through FIG. 9. Note that the embodiments below are exemplary, being intended to assist in understanding the constitutions and so forth of measurement systems and measurement apparatuses, and should not be interpreted in such a way as to limit the constitutions of the measurement systems or the measurement apparatuses.

Figure 1:
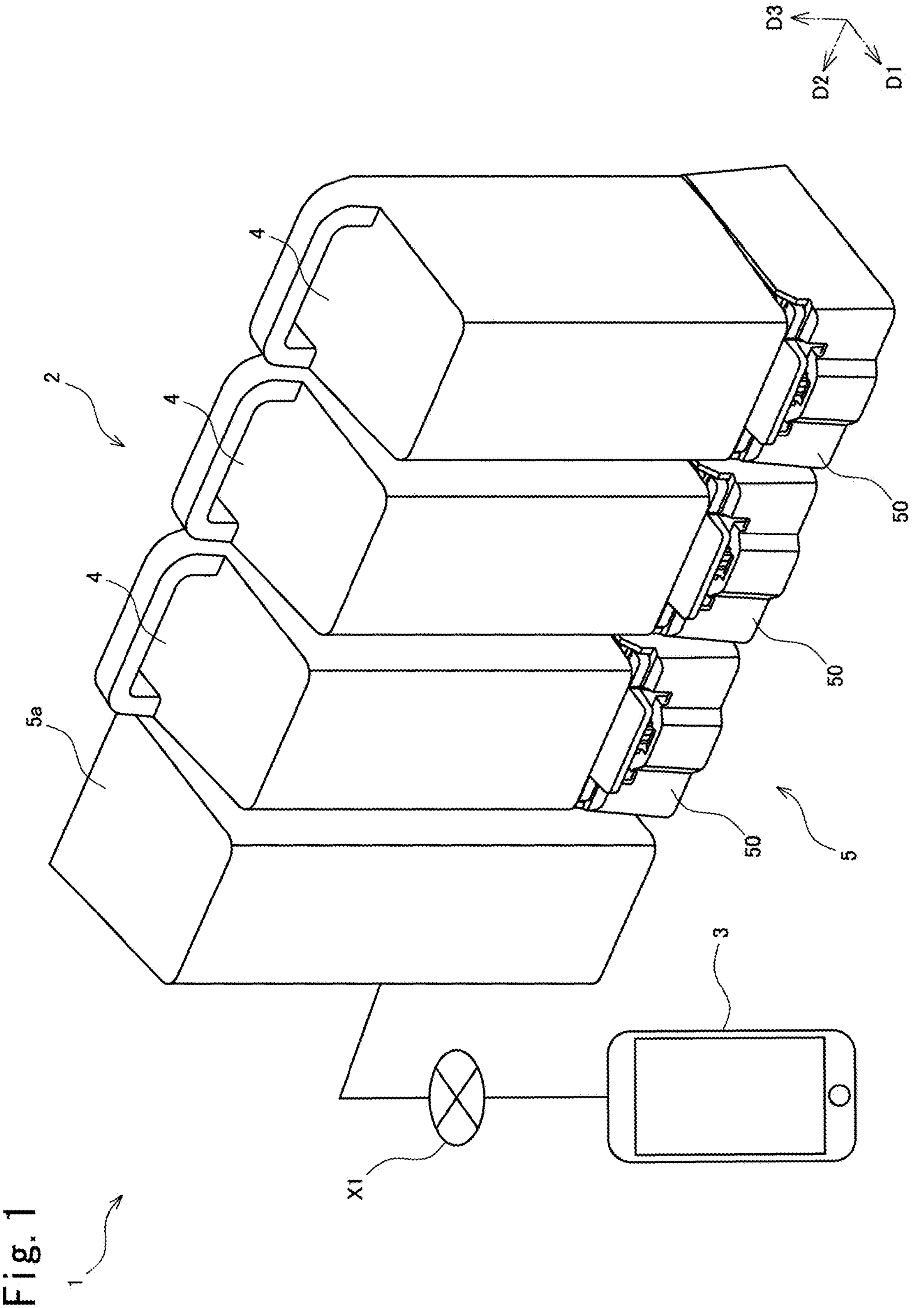
FIG. 1 is a schematic diagram of a measurement system associated with an embodiment.

As shown in FIG. 1, measurement system 1 might, for example, comprise measurement apparatus 2 which measures a fluid, and communication apparatus 3 which is capable of communicating with measurement apparatus 2 by means of communication means X1. Note that there is no particular limitation with respect to the fluid, it being possible, for example, for this to include not only liquid(s), but also mixtures of liquid(s) and gas(es), mixtures of liquid(s) and solid(s), and so forth.

At the respective drawings, note that first direction D1 is first horizontal direction D1; second direction D2 is second horizontal direction D2 which is a horizontal direction that is perpendicular to first horizontal direction D1; and third direction D3 is vertical direction D3 which is perpendicular to horizontal directions D1 and D2.

While there is no particular limitation with respect thereto, communication apparatus 3 may, e.g., as is the case in the present embodiment, be a mobile terminal (e.g., a smart device, tablet computer, notebook-type personal computer, or the like). Furthermore, communication means X1 might, for example, be Wi-Fi, a wireless LAN, or other such wireless communication means; or it might, for example, be a communication cable, a wired LAN, or other such wired communication means.

Figure 2:
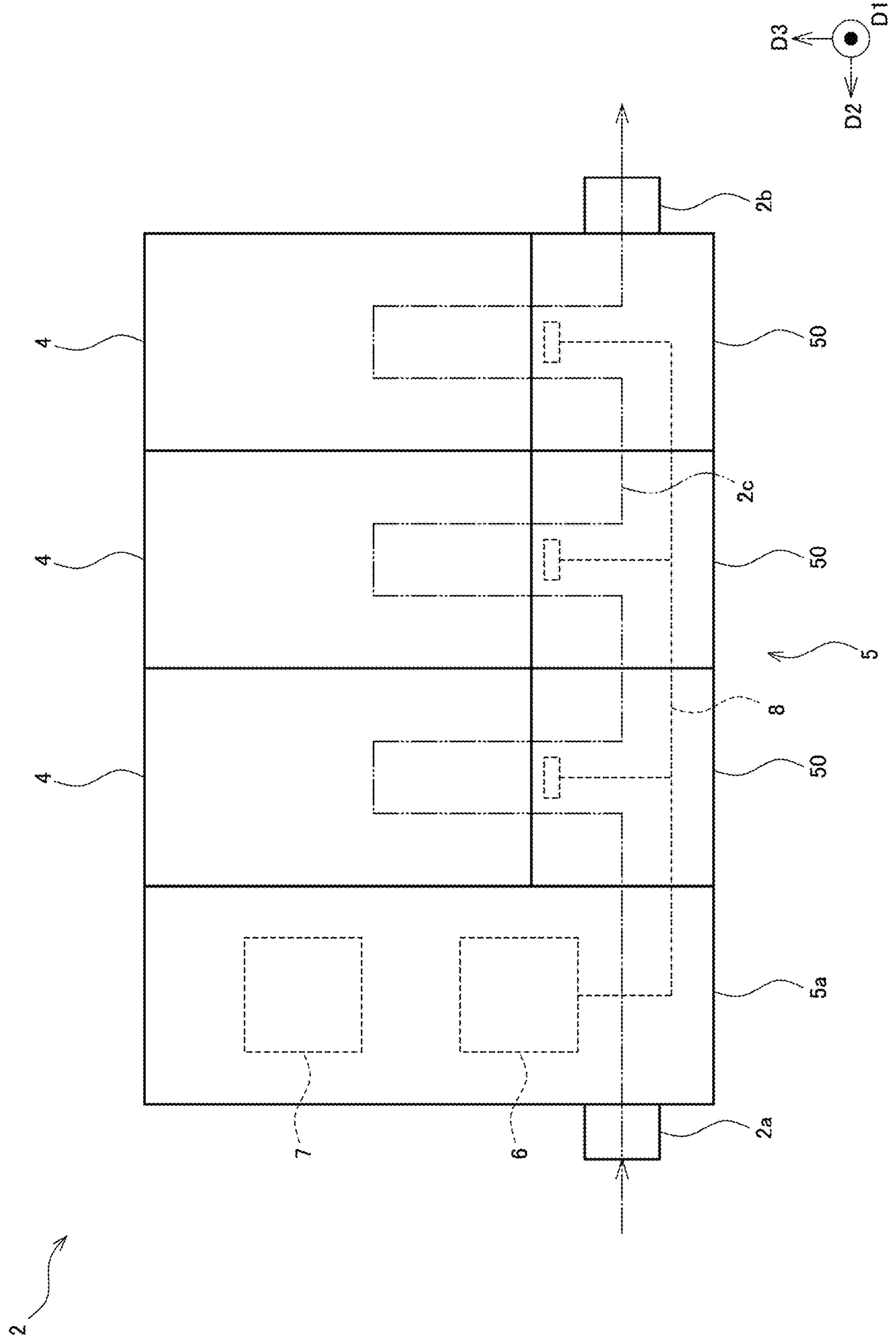
FIG. 2 is a schematic diagram of a measurement apparatus associated with same embodiment.
Figure 3:
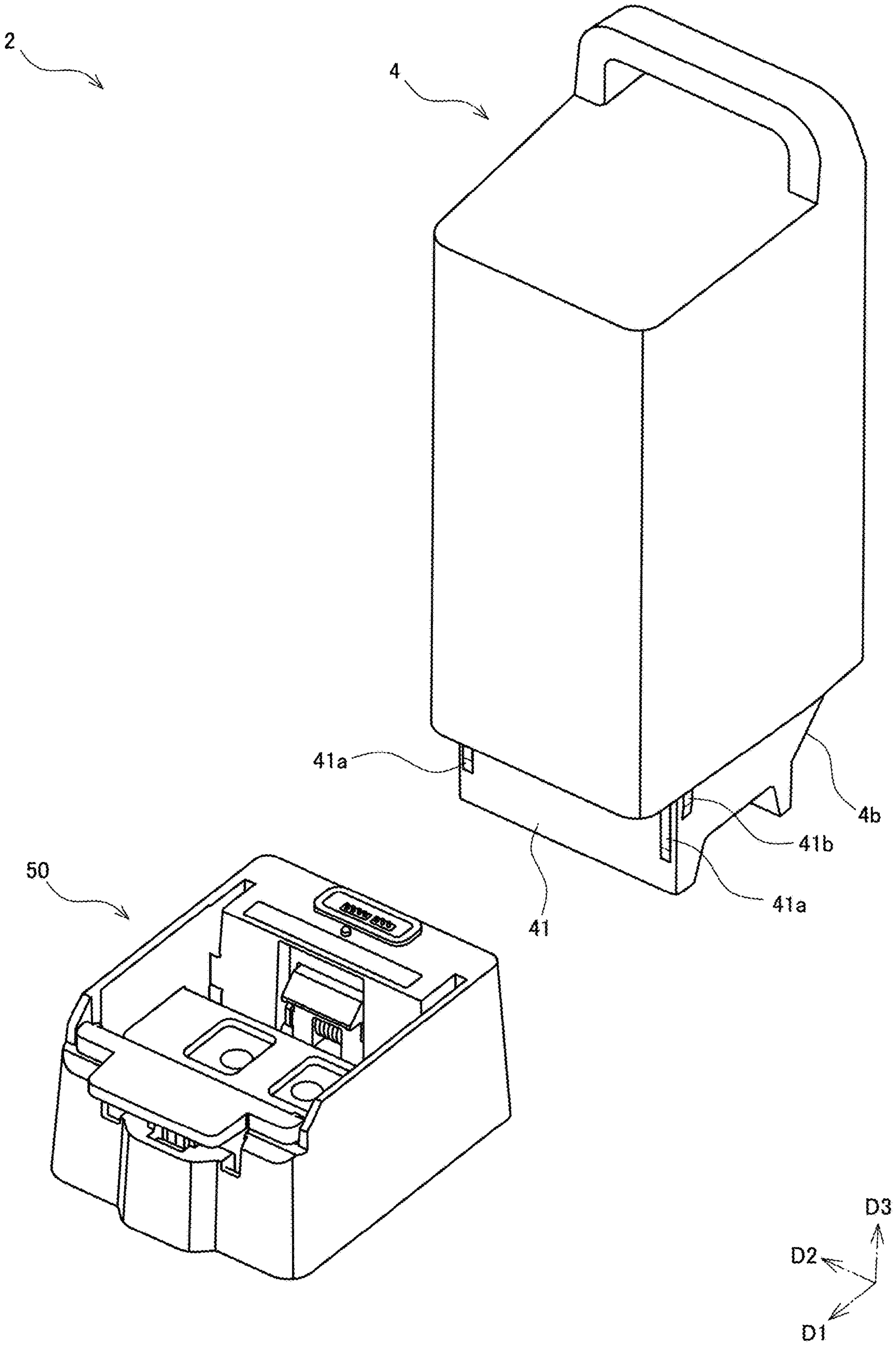
FIG. 3 is a perspective view of the principal components in a measurement apparatus associated with same embodiment, being a drawing showing a situation such as might exist when the measurement gauge is detached from the main body.

As shown in FIG. 1 through FIG. 3, measurement apparatus 2 might, for example, comprise a plurality (three in the present embodiment) of measurement gauges 4 which measure fluid(s), and main body 5 with respect to which the respective measurement gauges 4 are removably installed. Note that there is no particular limitation with respect to the number of measurement gauges 4 that are present, it being possible for there to be one, two, or four or more thereof.

So long as it is a measuring instrument that measures a fluid-related value (e.g., a characteristic value, state value, or the like), there is no particular limitation with regard to measurement gauge 4. For example, where measurement gauge 4 is a water quality meter that measures a water-related value, measurement gauge 4 might, for example, be a turbidimeter, colorimeter, pH meter, residual chlorine concentration meter, electrical conductivity meter, flow meter, water temperature meter, or the like. Note that a plurality of measurement gauges 4 may measure respectively different fluid-related values.

Main body 5 may, e.g., as is the case in the present embodiment, comprise a plurality of main body units 50 with respect to which measurement gauges 4 are removably installed, and common unit 5*a*. Furthermore, a constitution may be adopted in which, e.g., as is the case in the present embodiment, a plurality of main body units 50 are mutually removably installable, and common unit 5*a* is removably installable with respect to the main body units 50. Note, however, that the constitution of main body 5 is not limited to such constitution, it being possible, for example, for common unit 5*a* and the plurality of main body units 50 to be constituted in integral fashion such that they are nondetachable.

Measurement apparatus 2 might, e.g., as is the case in the present embodiment, comprise fluid inlet 2*a* into which fluid flows, fluid outlet 2*b* out of which fluid flows, and fluid passage 2*c* through which fluid flows in passing from fluid inlet 2*a* to fluid outlet 2*b*. A constitution may be adopted in which, e.g., as is the case in the present embodiment, installation of measurement gauge 4 with respect to main body 5 causes a fluid passage of measurement gauge 4 and a fluid passage of main body 5 to be mutually connected to constitute fluid passage 2*c*.

Common unit 5*a* might, e.g., as is the case in the present embodiment, comprise power supply unit 6 that supplies electric power (supplies electricity), processing unit 7 (e.g., a computer comprising a processor and memory) that processes data, and a communication unit (not shown) that communicates with communication apparatus 3. In addition, power supply unit 6 may, e.g., as is the case in the present embodiment, supply electricity to the respective main body units 50 by way of cable(s) 8 or the like.

Figure 4:
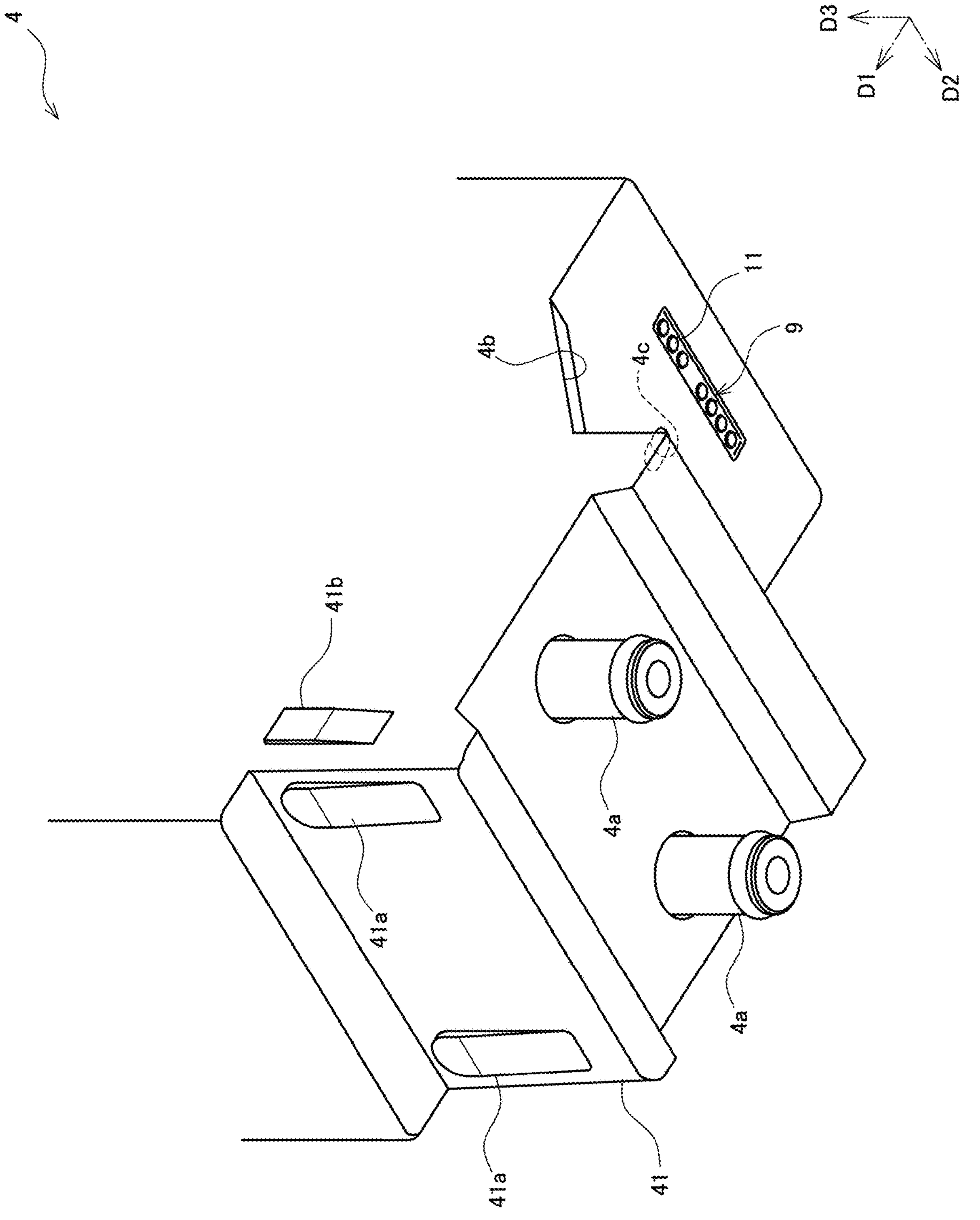
FIG. 4 is a perspective view of the principal components as seen from below a measurement gauge associated with same embodiment.
Figure 5:
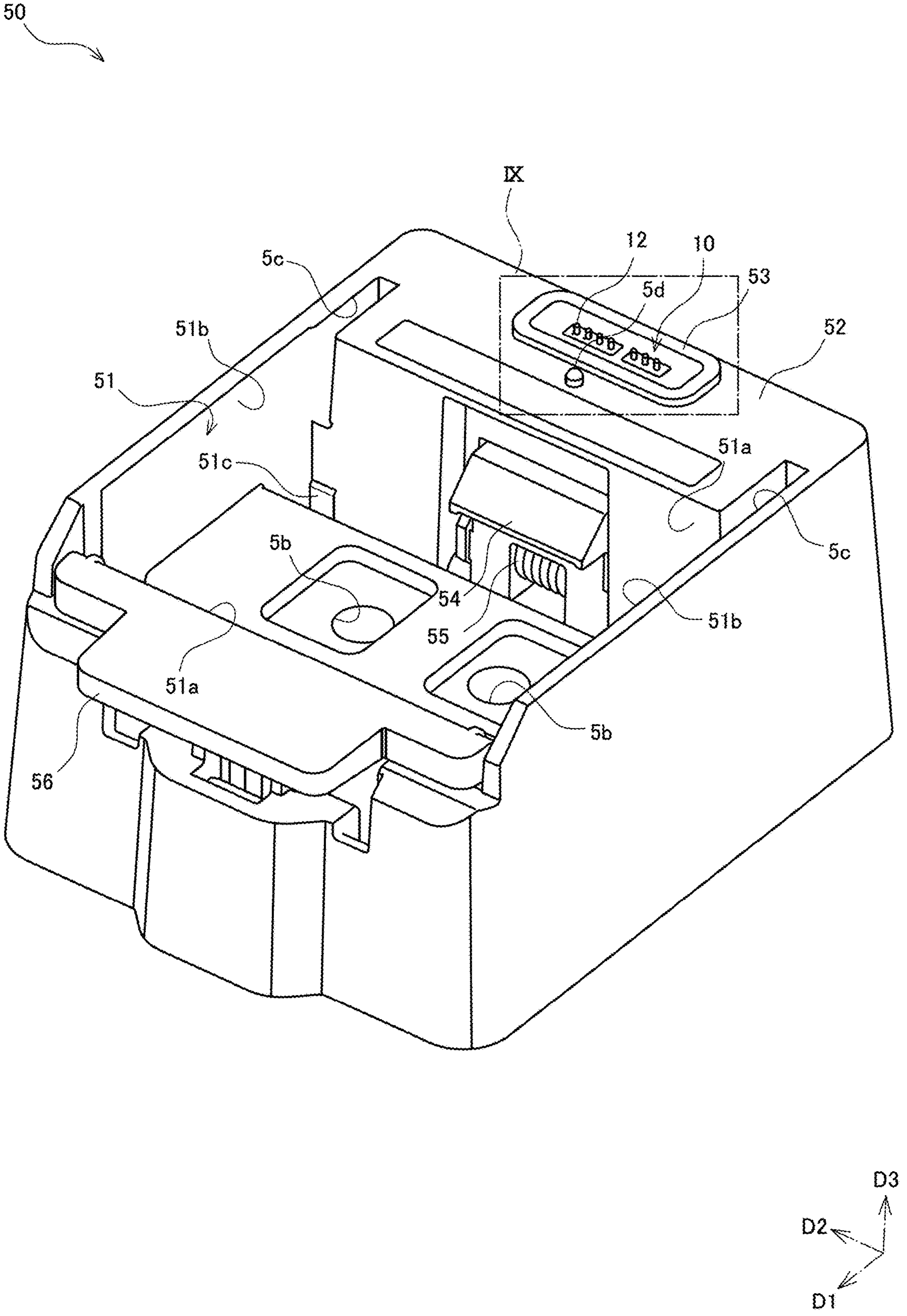
FIG. 5 is a perspective view of a main body associated with same embodiment.

For example, as shown in FIG. 3 through FIG. 5, it is also possible to adopt a constitution in which main body unit 50 comprises a main body recess 51 which is open thereabove, and measurement gauge 4 comprises measurement insertion portion 41 at the bottom thereof which is inserted into main body recess 51. This will make it possible, when measurement insertion portion 41 is inserted into main body recess 51, for measurement gauge 4 to be installed with respect to main body unit 50.

In addition, a constitution may be adopted in which, e.g., as is the case in the present embodiment, measurement insertion portion 41 comprises tubular measurement connectors 4*a* which extend in vertical direction D3, and main body recess 51 comprises recessed main body connectors 5*b* into which measurement connectors 4*a* are inserted. As a result, because installation of measurement gauge 4 with respect to main body unit 50 causes measurement connector(s) 4*a* and main body connector(s) 5*b* to be connected, this causes fluid passage(s) of measurement gauge 4 and fluid passage(s) of main body 5 to be connected (see FIG. 2).

Figure 6:
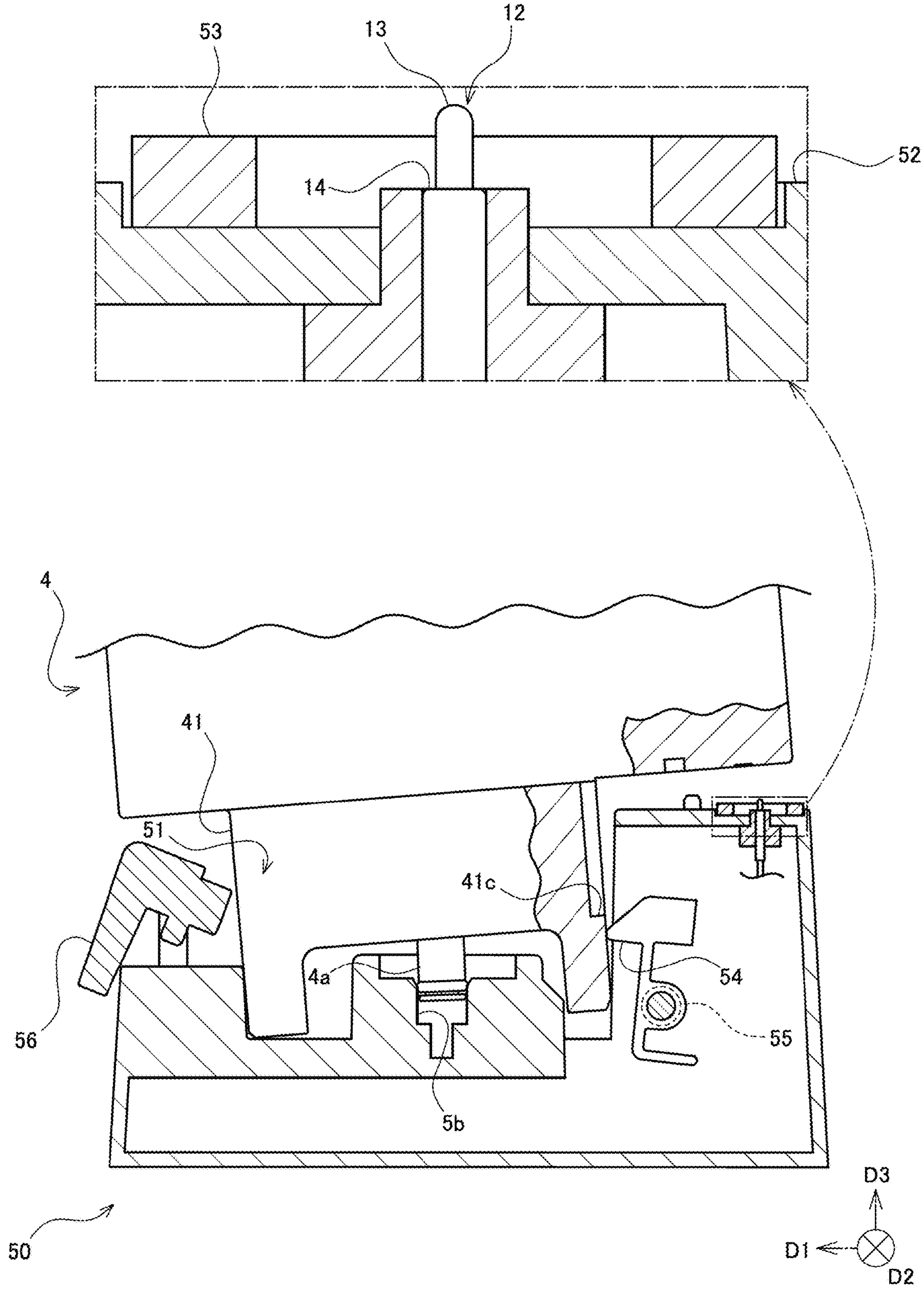
FIG. 6 is a side view showing a partial section of a measurement apparatus associated with same embodiment, being a drawing showing a situation such as might exist when the measurement gauge is separated from the main body.
Figure 7:
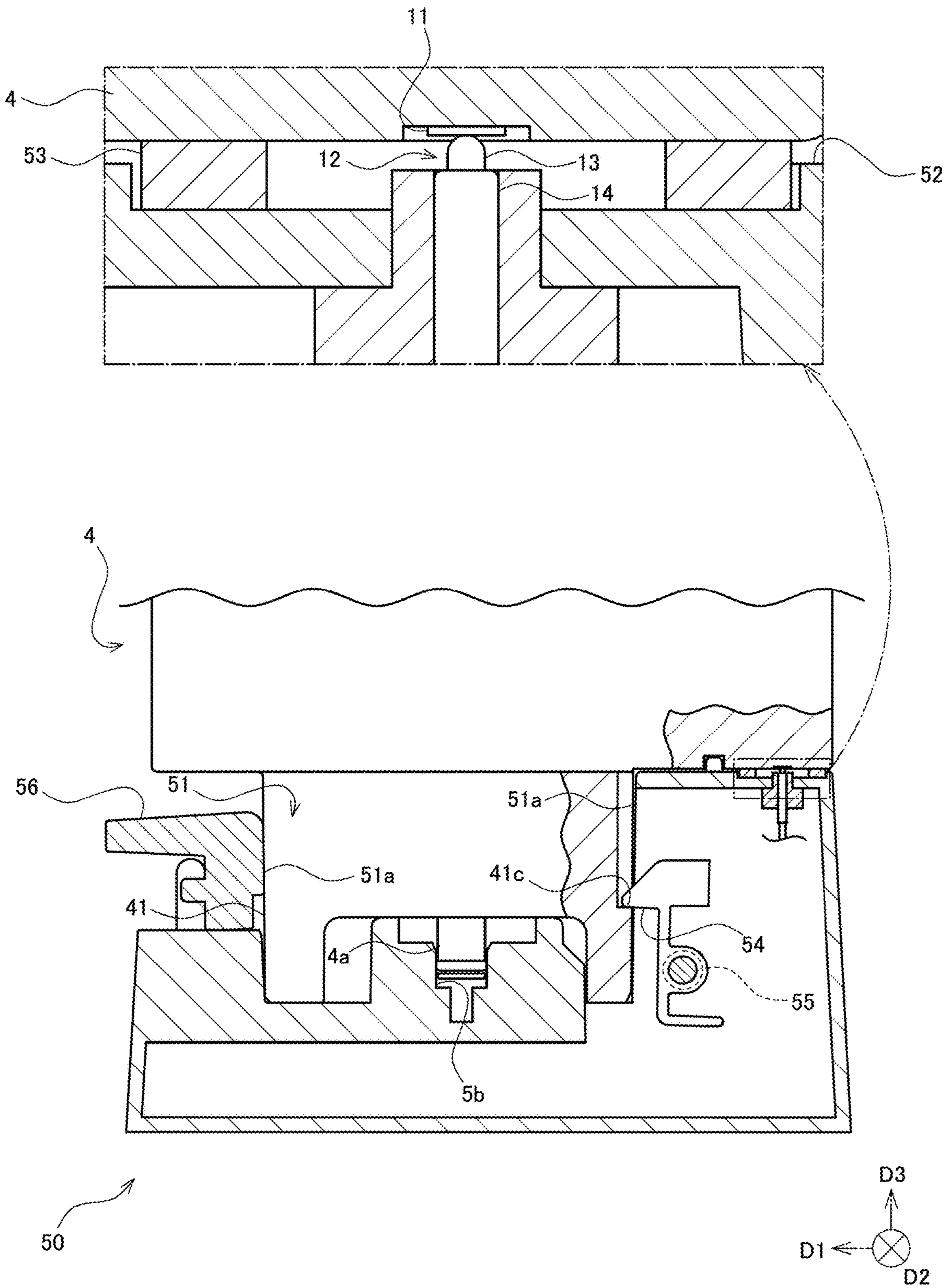
FIG. 7 is a side view showing a partial section of a measurement apparatus associated with same embodiment, being a drawing showing a situation such as might exist when the measurement gauge is installed with respect to the main body.

Furthermore, a constitution may be adopted in which, e.g., as is the case in the present embodiment, main body unit 50 comprises interlocking portion 54 which abuts on and stops measurement insertion portion 41 from above, and measurement insertion portion 41 comprises recessed interlocked portion 41*c* which is abutted on and stopped by interlocking portion 54 (see FIG. 6 and FIG. 7). As a result, when interlocked portion 41*c* is abutted on and stopped by interlocking portion 54, this causes measurement insertion portion 41 to be positioned with respect to main body recess 51 in vertical direction D3.

Interlocking portion 54 may, e.g., as is the case in the present embodiment, be rotatably connected to main body recess 51. As a result, interlocking portion 54 will engage in rotary displacement between a locked position at which interlocked portion 41*c* of measurement insertion portion 41 is abutted on and stopped from above, and an unlocked position at which said abutment and stopping does not occur. Moreover, main body unit 50 may, e.g., as is the case in the present embodiment, comprise locking force providing portion 55 which exerts an elastic restoring force on interlocking portion 54 such as will tend to cause interlocking portion 54 to be located in the locked position. While there is no particular limitation with respect thereto, locking force providing portion 55 might, for example, be a spring.

Main body recess 51 may, e.g., as is the case in the present embodiment, comprise a pair of first sandwiching members 51*a*, 51*a* which sandwich measurement insertion portion 41 in first horizontal direction D1, and a pair of second sandwiching members 51*b*, 51*b* which sandwich measurement insertion portion 41 in second horizontal direction D2. This will make it possible for measurement insertion portion 41 to be positioned with respect to main body recess 51 in horizontal directions D1 and D2.

Furthermore, a constitution may be adopted in which, e.g., as is the case in the present embodiment, main body recess 51 comprises actuation region 56 which is capable of being actuated, actuation region 56 constituting one of the first sandwiching members 51*a*. For example, a constitution may be adopted in which, as is the case in the present embodiment, actuation region 56 is capable of being actuated so as to engage in displacement between a sandwiched position (see FIG. 3, FIG. 5, and FIG. 7) at which it abuts measurement insertion portion 41, and a nonsandwiched position (see FIG. 6) at which it is separated from measurement insertion portion 41.

Measurement insertion portion 41 may, e.g., as is the case in the present embodiment, comprise first measurement protrusion 41*a* which protrudes in first horizontal direction D1, and second measurement protrusion 41*b* which protrudes in second horizontal direction D2. Furthermore, main body recess 51 may, e.g., as is the case in the present embodiment, comprise first main body protrusion(s) 51*c* which protrude from first sandwiching member(s) 51*a* in first horizontal direction D1.

Furthermore, measurement gauge 4 and main body unit 50 may, e.g., as is the case in the present embodiment, comprise first and second engaging members 4*b*, 4*c*, Sc, 5*d* which mutually engage. For example, a constitution may be adopted in which, as is the case in the present embodiment, first measurement engaging member 4*b* is formed so as to be convex, and first main body engaging member Sc is formed so as to be concave so as to permit first measurement engaging member 4*b* to be inserted therewithin; and moreover, second main body engaging member 5*d* is formed so as to be convex, and second measurement engaging member 4*c* is formed so as to be concave so as to permit second main body engaging member 5*d* to be inserted therewithin.

Furthermore, a constitution may be adopted in which, e.g., as is the case in the present embodiment, measurement gauge 4 comprises measurement terminal portion 9 which is a group of electrical terminals, and main body unit 50 comprises main body terminal portion 10 which is a group of electrical terminals that make contact with measurement terminal portion 9. As a result, when measurement gauge 4 is installed with respect to main body unit 50, this causes measurement terminal portion 9 and main body terminal portion 10 to be electrically connected.

Furthermore, a constitution may be adopted in which, e.g., as is the case in the present embodiment, measurement terminal portion 9 comprises a plurality of measurement terminals 11, and main body terminal portion 10 comprises a plurality of main body terminals 12 that make contact with measurement terminals 11. Moreover, while there is no particular limitation with respect to the number of measurement terminals 11 and main body terminals 12, the number that are present in the present embodiment is seven.

As shown in FIG. 5 and FIG. 6, main body unit 50 might, for example, comprise a base portion 52 which constitutes the top of main body unit 50, and a sealing portion 53 which is secured to the top of base portion 52 and which seals measurement terminals 11 and main body terminals 12. Sealing portion 53 may, e.g., as is the case in the present embodiment, be formed in annular fashion such that main body terminals 12 are arranged at the interior thereof. In addition, sealing portion 53 may, for example, possess elasticity.

Main body terminal 12 may, e.g., as is the case in the present embodiment, comprise terminal movable portion 13 which is movable with respect to base portion 52 in vertical direction D3, terminal stationary portion 14 which is secured to base portion 52 and which slidably retains terminal movable portion 13, and a terminal force providing portion (not shown) which exerts an upward elastic restoring force on terminal movable portion 13.

Next, a method by which measurement gauge 4 may be removably installed with respect to main body unit 50 will be described with reference to FIG. 6 and FIG. 7. Note, however, that methods by which measurement gauge 4 may be removably installed with respect to main body unit 50 are not limited to the following method.

As shown in FIG. 6, when measurement gauge 4 is installed with respect to main body unit 50, measurement insertion portion 41 is inserted within the interior of main body recess 51. In addition, as shown in FIG. 7, actuation of actuation region 56 causes actuation region 56 to be located in the sandwiched position. As a result, when actuation region 56 abuts measurement insertion portion 41, this causes measurement insertion portion 41 to be sandwiched between a pair of first sandwiching members 51*a*, 51*a*.

In addition, interlocking portion 54, when in the locked position, abuts on and stops interlocked portion 41*c* of measurement insertion portion 41 from above; and moreover, because locking force providing portion 55 exerts an elastic restoring force on interlocking portion 54, measurement gauge 4 does not become dislodged from main body unit 50. This makes it possible for measurement gauge 4 to be installed with respect to main body unit 50.

In addition, measurement terminals 11 make contact with main body terminals 12. More specifically, measurement terminal 11 is arranged above main body terminal 12, and measurement terminal 11 and main body terminal 12 make contact in vertical direction D3.

At such time, when terminal movable portion 13 of main body terminal 12 is pressed downward by measurement terminal 11, this causes terminal movable portion 13 to move downward relative to terminal stationary portion 14. In addition, because the terminal force providing portion (not shown) exerts an upward elastic restoring force on terminal movable portion 13, terminal movable portion 13 makes contact with measurement terminal 11 such that a pressure acts thereon. This makes it possible to definitively cause measurement terminal 11 and main body terminal 12 to be electrically connected.

In addition, because measurement gauge 4 and base portion 52 of main body unit 50 sandwich sealing portion 53 in vertical direction D3, sealing portion 53 undergoes elastic deformation in vertical direction D3 and comes into intimate contact with measurement gauge 4. As a result, sealing portion 53, base portion 52, and measurement gauge 4 cooperate to cover measurement terminal 11 and main body terminal 12, which causes measurement terminal 11 and main body terminal 12 to be sealed.

Furthermore, first measurement protrusion 41*a* (see FIG. 3 and FIG. 4) and first main body protrusion 51*c* (see FIG. 5) are able to effectively inhibit measurement insertion portion 41 from becoming dislocated in first horizontal direction D1 relative to main body recess 51. Moreover, it is also possible, e.g., as is the case in the present embodiment, to adopt a constitution in which the height with which first measurement protrusion 41*a* protrudes increases as one proceeds upward, and the height with which first main body protrusion 51*c* protrudes increases as one proceeds downward.

Furthermore, second measurement protrusion 41*b* (see FIG. 3 and FIG. 4) is able to effectively inhibit measurement insertion portion 41 from becoming dislocated in second horizontal direction D2 relative to main body recess 51. Moreover, it is also possible, e.g., as is the case in the present embodiment, to adopt a constitution in which the height with which second measurement protrusion 41*b* protrudes increases as one proceeds upward.

Conversely, when measurement gauge 4 is separated from main body unit 50, actuation of actuation region 56 causes actuation region 56 to be located in the nonsandwiched position as shown in FIG. 6. As a result, actuation region 56 will be separated from measurement insertion portion 41. In addition, when measurement insertion portion 41 is pulled free of main body recess 51, this causes measurement gauge 4 to be separated from main body unit 50.

Next, the constitutions of measurement terminal portion 9 and main body terminal portion 10, and a method for supplying electricity to measurement apparatus 2 (more specifically, a method for supplying electricity to measurement gauge 4), will be described with reference to FIG. 8 and FIG. 9. Note, however, that constitutions of measurement terminal portion 9 and main body terminal portion 10 are not limited to the following constitutions, nor are methods for supplying electricity to measurement apparatus 2 limited to the following method.

Figure 8:
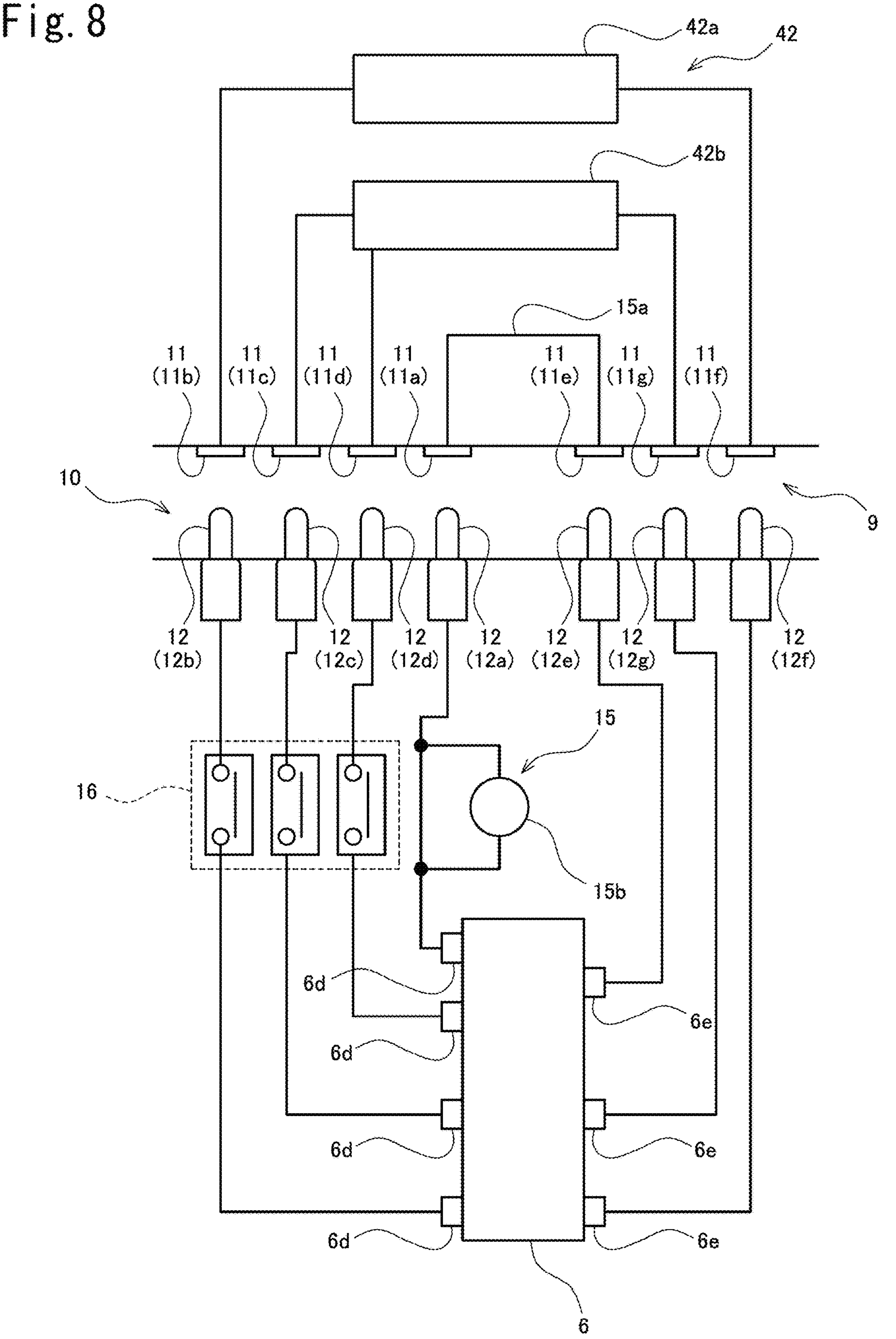
FIG. 8 is a circuit diagram for a measurement apparatus associated with same embodiment.

As shown in FIG. 8, power supply unit 6 might, for example, be a DC power supply 6. In addition, it is possible to adopt a constitution in which DC power supply 6 comprises first polarity unit 6*d* which is of a first polarity (e.g., positive), and second polarity unit 6*e* which is of a second polarity (e.g., negative) that is different from the first polarity.

Measurement gauge 4 might, for example, comprise measurement circuit unit 42 for measuring fluid(s). Measurement circuit unit 42 may, e.g., as is the case in the present embodiment, comprise power supply circuit unit 42*a* which serves as main power supply for measurement gauge 4, and control circuit unit 42*b* which serves as control power supply (e.g., power supply for control signals for controlling respective components at measurement gauge 4, electrical signals indicating measured values, etc.) for measurement gauge 4.

Main body terminal(s) 12 may, e.g., as is the case in the present embodiment, comprise a plurality of first main body terminals 12*a* through 12*d* which are electrically connected to first polarity unit 6*d*, and a plurality of second main body terminals 12*e* through 12*g* which are electrically connected to second polarity unit 6*e*. While there is no particular limitation with respect to the number of respective main body terminals 12 that are present, in the present embodiment, for example, the number of first main body terminals 12*a* through 12*d* that are present is four, and the number of second main body terminals 12*e* through 12*g* that are present is three.

Furthermore, measurement apparatus 2 may, e.g., as is the case in the present embodiment, comprise detection unit 15 which detects installation of measurement gauge 4 with respect to main body 5, and switching unit 16 which switches between a state in which electrical connection between power supply unit 6 and main body terminal portion 10 is blocked and a state in which electrical connection is made, based on detection occurring at detection unit 15. For example, detection unit 15 might detect installation of measurement gauge 4 with respect to main body 5 by detecting that contact has been made between measurement terminal(s) 11 of measurement terminal portion 9 and main body terminal(s) 12 of main body terminal portion 10.

First main body terminals 12*a* through 12*d* may, e.g., as is the case in the present embodiment, comprise first main body detection terminal 12*a* which is electrically connected to first polarity unit 6*d* without being routed through switching unit 16, and first main body switching terminals 12*b* through 12*d* which are electrically connected to first polarity unit 6*d* by way of switching unit 16. Moreover, while there is no particular limitation with respect to the number of first main body switching terminals 12*b* through 12*d*, the number that are present in the present embodiment might, for example, be three.

Second main body terminals 12*e* through 12*g* may, e.g., as is the case in the present embodiment, comprise second main body detection terminal 12*e* which is electrically connected to second polarity unit 6*e* without being routed through switching unit 16, and second main body switching terminals 12*f* through 12*g* which are electrically connected to second polarity unit 6*e* without being routed through switching unit 16. Moreover, while there is no particular limitation with respect to the number of second main body switching terminals 12*f* through 12*g*, the number that are present in the present embodiment might, for example, be two.

Measurement terminal 11 may, e.g., as is the case in the present embodiment, comprise first measurement detection terminal 11*a* which comes in contact with first main body detection terminal 12*a*, first measurement switching terminals 11*b* through 11*d* which come in contact with first main body switching terminals 12*b* through 12*d*, second measurement detection terminal lie which comes in contact with second main body detection terminal 12*e*, and second measurement switching terminals 11*f* through 11*g* which comes in contact with second main body switching terminals 12*f* through 12*g*.

Detection unit 15 may, e.g., as is the case in the present embodiment, comprise detection circuit unit 15*a* which, when first main body detection terminal 12*a* and first measurement detection terminal 11*a* come in contact and second main body detection terminal 12*e* and second measurement detection terminal lie come in contact, causes formation of a closed circuit between first main body detection terminal 12*a* and second main body detection terminal 12*e*; and electric current detection unit 15*b* which detects flow of electric current at detection circuit unit 15*a*.

In addition, a constitution may be adopted in which, e.g., as is the case in the present embodiment, when flow of electric current at detection circuit unit 15*a* is not detected by electric current detection unit 15*b*, switching unit 16 causes electrical connection between power supply unit 6 and first main body switching terminals 12*b* through 12*d* to be blocked; and when flow of electric current at detection circuit unit 15*a* is detected by electric current detection unit 15*b*, switching unit 16 causes electrical connection to be made between power supply unit 6 and first main body switching terminals 12*b* through 12*d*.

As a result, when measurement gauge 4 is installed with respect to main body unit 50, this causes first main body detection terminal 12*a* and first measurement detection terminal 11*a* to come in contact, and this also causes second main body detection terminal 12*e* and second measurement detection terminal lie to come in contact. Accordingly, because detection circuit unit 15*a* causes formation of a closed circuit between first and second main body detection terminals 12*a*, 12*e*, electric current will flow at detection circuit unit 15*a*.

In addition, because flow of electric current at detection circuit unit 15*a* is detected by electric current detection unit 15*b*, electrical connection between power supply unit 6 and first main body switching terminals 12*b* through 12*d* is switched from a state in which electrical connection is blocked to a state in which electrical connection is made. As a result, because measurement switching terminals lib through 11*d*, 11*f* through 11*g*, and main body switching terminals 12*b* through 12*d*, 12*f* through 12*g* come in contact, closed circuit(s) are formed between first and second main body switching terminals 12*b* through 12*d*, 12*f* through 12*g* by way of measurement circuit unit 42.

Accordingly, because power supply unit 6 is switched from a state in which supply of electricity to measurement circuit unit 42 of measurement gauge 4 is stopped to a state in which electricity is supplied to measurement circuit unit 42 of measurement gauge 4, electric power from power supply unit 6 is supplied to measurement gauge 4. That is, voltage(s) applied across first and second main body switching terminals 12*b* through 12*d*, 12*f* through 12*g* are applied to measurement circuit unit 42. Note that because first and second main body detection terminals 12*a*, 12*e* are terminals for causing flow of electric current which is detected at detection unit 15, they are also referred to as first and second electric current detection terminals 12*a*, 12*e*.

Note that there is no particular limitation with respect to the constitutions of detection unit 15 and switching unit 16. Detection unit 15 and switching unit 16 might, for example, be constituted from hardware electric components (e.g., timers, various relays, photocouplers); or they might, for example, be constituted from software electric components (software sequencers); or they might, for example, be constituted from hardware electric components and software electric components.

Figure 9:
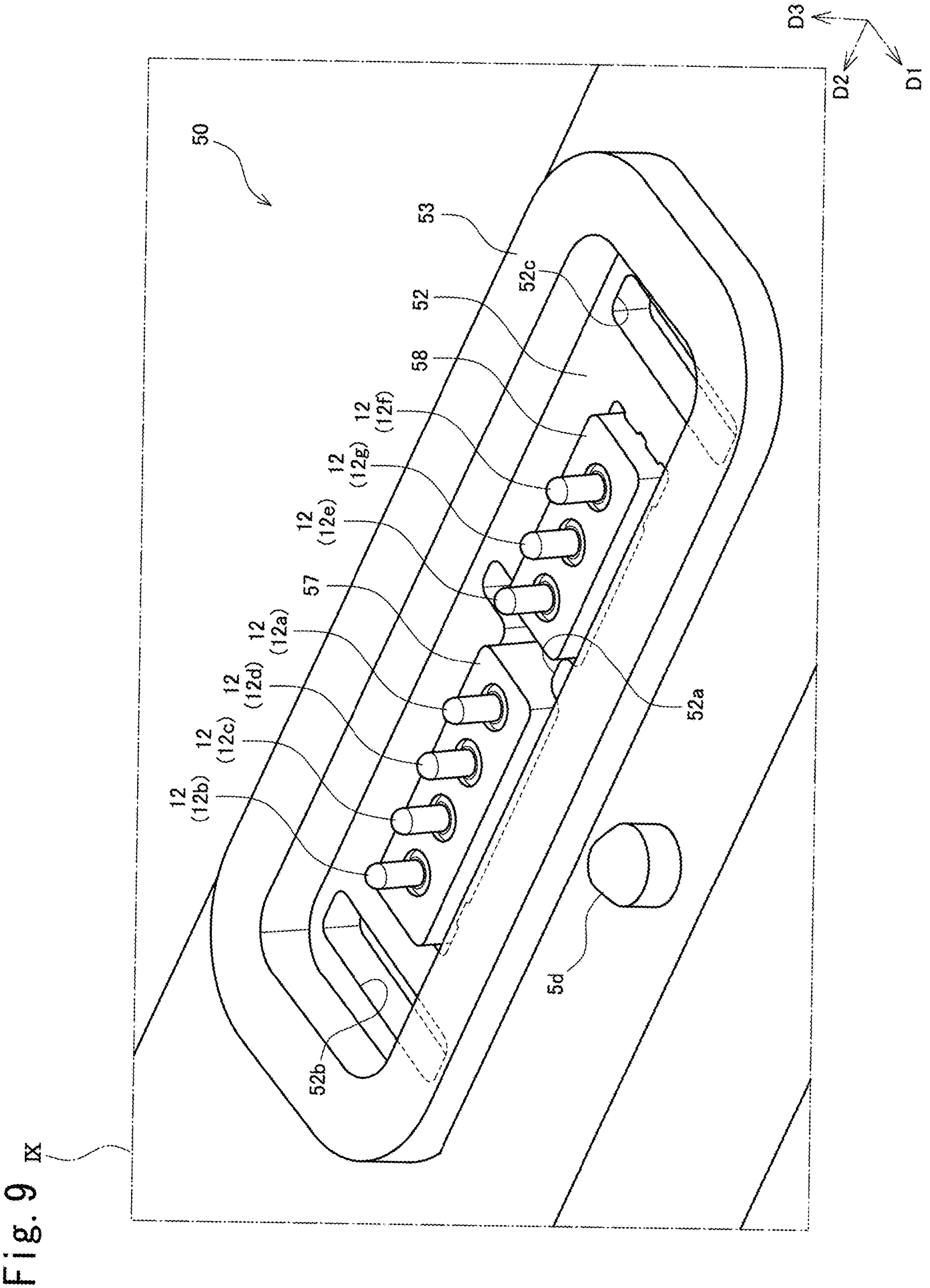
FIG. 9 is an enlarged view of region IX in FIG. 5.

As shown in FIG. 9, main body terminals 12*a* through 12*g* might, for example, be arrayed so as line up in a single row in parallel fashion with respect to second horizontal direction D2. More specifically, a constitution may be adopted in which, e.g., as is the case in the present embodiment, a plurality of first main body terminals 12*a* through 12*d* are arrayed so as line up in a single row in parallel fashion with respect to horizontal direction D2, and a plurality of second main body terminals 12*e* through 12*f* are arrayed so as line up in a single row in parallel fashion with respect to second horizontal direction D2, and in adjacent fashion with respect to the plurality of first main body terminals 12*a* through 12*d* so as to line up in a single row together with the plurality of first main body terminals 12*a* through 12*d*.

In addition, it is possible, e.g., as is the case in the present embodiment, for that first main body terminal 12*a* which among first main body terminals 12*a* through 12*d* is nearest to second main body terminals 12*e* through 12*g* to be first main body detection terminal 12*a*. Furthermore, it is possible, e.g., as is the case in the present embodiment, for that second main body terminal 12*e* which among second main body terminals 12*e* through 12*g* is nearest to first main body terminals 12*a* through 12*d* to be the second main body detection terminal 12*e*.

Furthermore, main body unit 50 might, for example, comprise first retaining portion 57 which is secured to base portion 52 and which retains a plurality of first main body terminals 12*a* through 12*d*, and second retaining portion 58 which is secured to base portion 52 and which retains a plurality of second main body terminals 12*e* through 12*g*. In addition, first retaining portion 57 and second retaining portion 58 may, e.g., as is the case in the present embodiment, retain the lower portions of main body terminals 12 which extend in vertical direction D3. As a result, main body terminals 12 will protrude upward from retaining portions 57, 58.

In addition, base portion 52 may, e.g., as is the case in the present embodiment, comprise first through third through-holes 52*a* through 52*c* which extend in vertical direction D3 at the interior of sealing portion 53. As a result, because fluid entering the interior of sealing portion 53 will be discharged by means of through-holes 52*a* through 52*c*, this will make it possible to suppress accumulation of fluid at the interior of sealing portion 53.

Moreover, a constitution may be adopted in which, e.g., as is the case in the present embodiment, first retaining portion 57 and second retaining portion 58 are separated, and first through-hole 52*a* is arranged between first retaining portion 57 and second retaining portion 58. As a result, because fluid between first and second retaining portions 57, 58 will be made to drain therefrom by means of first through-hole 52*a*, this will make it possible to suppress accumulation of fluid everywhere along the region between first and second retaining portions 57, 58.

Furthermore, respective retaining portions 57, 58 may, e.g., as is the case in the present embodiment, protrude upward from base portion 52. As a result, because the region between first and second retaining portions 57, 58 will be recessed, even were fluid to accumulate at the interior of sealing portion 53, this will make it possible to suppress accumulation of fluid everywhere along the region between first and second retaining portions 57, 58.

Furthermore, respective retaining portions 57, 58 may, e.g., as is the case in the present embodiment, cause respective main body terminals 12 to be retained so as to be separated from base portion 52. As a result, because respective retaining portions 57, 58 protrude upward from base portion 52, even were fluid to accumulate at the interior of sealing portion 53, this will make it possible to suppress accumulation of fluid everywhere along the region between respective retaining portions 57, 58 and base portion 52. Accordingly, it will be possible to suppress accumulation of fluid everywhere along the region between base portion 52 and main body terminals 12.

It will thus be possible to effectively suppress accumulation of fluid everywhere along the region between first and second main body terminals 12*a* through 12*d*, 12*e* through 12*g*. However, even when, for example, measurement gauge 4 is not installed with respect to main body unit 50, there are situations in which accumulation of a large amount of fluid at the interior of sealing portion 53 causes electrical connection to be made between first and second main body detection terminals 12*a*, 12*e* due to presence of the fluid.

In such case, electric current will flow between first and second main body detection terminals 12*a*, 12*e*. Note, however, that because the voltage applied across first and second main body detection terminals 12*a*, 12*e* is a DC voltage, although said electric current might flow momentarily (e.g., for several microseconds), it will not flow continuously. This is because, where DC voltages are involved, formation of an electrical double layer causes the fluid to act like a capacitor.

A constitution may therefore be adopted in which, e.g., as is the case in the present embodiment, when electric current detection unit 15*b* detects flow of electric current at detection circuit unit 15*a* for a prescribed amount of time, switching unit 16 causes electrical connection between power supply unit 6 and first main body switching terminals 12*b* through 12*d* to be switched from a state in which electrical connection is blocked to a state in which electrical connection is made. This will make it possible to suppress erroneous application of voltage(s) from power supply unit 6 across first and second main body switching terminals 12*b* through 12*d*, 12*f* through 12*g*.

Conversely, a constitution may be adopted in which, when electric current detection unit 15*b* detects absence of flow of electric current at detection circuit unit 15*a* for a prescribed amount of time, switching unit 16 causes electrical connection between power supply unit 6 and first main body switching terminals 12*b* through 12*d* to be switched from a state in which electrical connection is made to a state in which electrical connection is blocked. This will make it possible to suppress erroneous application of voltage(s) from power supply unit 6 across first and second main body switching terminals 12*b* through 12*d*, 12*f* through 12*g*.

While there is no particular limitation with respect thereto, the prescribed time might, for example, be not less than 100 msec, not less than 200 msec being, for example, preferred. Furthermore, so as to smoothly cause electric power to be supplied to measurement gauge 4 following installation of measurement gauge 4 with respect to main body 5, the prescribed time might, for example, be not greater than 1000 msec, not greater than 500 msec being, for example, preferred.

As described above, as in the present embodiment, it is preferred that the measurement apparatus 2 comprises:

- a measurement gauge 4 that measures a fluid; and
- a main body 5 with respect to which the measurement gauge 4 is removably installable;
- wherein the measurement gauge 4 comprises a plurality of measurement terminals 11;
- wherein the main body 5 comprises a plurality of main body terminals 12 that come in contact with the plurality of measurement terminals 11 when the measurement gauge 4 is installed with respect to the main body 5; and
- wherein the measurement apparatus 2 comprises
  - a power supply unit 6 that supplies electricity to the plurality of main body terminals 12;
  - a detection unit 15 that detects installation of the measurement gauge 4 with respect to the main body 5; and
  - a switching unit 16 that, when the detection unit 15 detects the installation of the measurement gauge 4 with respect to the main body 5, causes electrical connection between the power supply unit 6 and at least one (first main body switching terminals 12*b* through 12*d* in the present embodiment) of the plurality of main body terminals 12 to be switched from a state in which electrical connection is blocked to a state in which electrical connection is made.

In accordance with such constitution, installation of measurement gauge 4 with respect to main body 5 causes a plurality of main body terminals 12 to come in contact with a plurality of measurement terminals 11, and detection unit 15 detects that measurement gauge 4 has been installed with respect to main body 5. In addition, when detection unit 15 has detected that said installation thereof with respect thereto has occurred, electrical connection between power supply unit 6 and at least one (first main body switching terminals 12*b* through 12*d* in the present embodiment) among a plurality of main body terminals 12 is switched from a state in which electrical connection is blocked to a state in which electrical connection is made. This makes it possible for electric power from power supply unit 6 to be supplied to measurement gauge 4 by way of main body 5.

Further, as in the present embodiment, it is preferred that the measurement apparatus 2 includes a configuration in which:

- wherein the detection unit 15 detects contact between the measurement terminals 11 and the main body terminals 12; and
- wherein, when the contact is detected by the detection unit 15, the switching unit 16 causes electrical connection between the power supply unit 6 and at least one (first main body switching terminals 12*b* through 12*d* in the present embodiment) of the plurality of main body terminals 12 to be switched from a state in which electrical connection is blocked to a state in which electrical connection is made.

In accordance with such constitution, when detection unit 15 has detected that contact has been made between measurement terminal(s) 11 and main body terminal(s) 12, electrical connection between power supply unit 6 and at least one (first main body switching terminals 12*b* through 12*d* in the present embodiment) among a plurality of main body terminals 12 is switched from a state in which electrical connection is blocked to a state in which electrical connection is made. This makes it possible for electric power from power supply unit 6 to be supplied to measurement gauge 4 by way of main body 5 after contact has been made between measurement terminal(s) 11 and main body terminal(s) 12.

Further, as in the present embodiment, it is preferred that the measurement apparatus 2 includes a configuration in which:

- wherein the plurality of main body terminals 12 comprise
  - a first main body detection terminal 12*a;*
  - a second main body detection terminal 12*e*, across with which and the first main body detection terminal 12*a* a voltage from the power supply unit 6 is applied; and
  - at least one main body switching terminal 12*b* through 12*d* that is connected to the power supply unit 6 by way of the switching unit 16;
- wherein the measurement gauge 4 comprises
  - a first measurement detection terminal 11*a* that comes in contact with the first main body detection terminal 12*a;*
  - a second measurement detection terminal lie that comes in contact with the second main body detection terminal 12*e*; and
  - at least one measurement switching terminal 11*b* through 11*d* that comes in contact with the at least one main body switching terminal 12*b* through 12*d;*
- wherein the detection unit 15 comprises
  - a detection circuit unit 15*a* that, when the first main body detection terminal 12*a* and the first measurement detection terminal 11*a* come in contact and the second main body detection terminal 12*e* and the second measurement detection terminal lie come in contact, causes formation of a closed circuit between the first main body detection terminal 12*a* and the second main body detection terminal 12*e*; and an electric current detection unit 15*b* that detects flow of electric current at the detection circuit unit 15*a;* wherein, when the electric current is detected by the electric current detection unit 15*b*, the switching unit 16 causes electrical connection between the power supply unit 6 and the at least one main body switching terminal 12*b* through 12*d* to be switched from a state in which electrical connection is blocked to a state in which electrical connection is made.

In accordance with such constitution, when measurement gauge 4 is installed with respect to main body 5, this causes first main body detection terminal 12*a* and first measurement detection terminal 11*a* to come in contact, and this also causes second main body detection terminal 12*e* and second measurement detection terminal lie to come in contact. As a result, detection circuit unit 15*a* causes a closed circuit to be formed between first main body detection terminal 12*a* and second main body detection terminal 12*e*.

In addition, because voltage from power supply unit 6 is applied across first main body detection terminal 12*a* and second main body detection terminal 12*e*, electric current flows at detection circuit unit 15*a*. Accordingly, because electric current flowing at detection circuit unit 15*a* is detected by electric current detection unit 15*b*, electrical connection between power supply unit 6 and at least one of first main body switching terminals 12*b* through 12*d* is switched from a state in which electrical connection is blocked to a state in which electrical connection is made.

Further, as in the present embodiment, it is preferred that the measurement apparatus 2 includes a configuration in which:

wherein the power supply unit 6 is a DC power supply 6 having a first polarity unit 6*d* that is of a first polarity, and a second polarity unit 6*e* that is of a second polarity which is different from the first polarity;

wherein the first main body detection terminal 12*a* is electrically connected to the first polarity unit 6*d;* wherein the second main body detection terminal 12*e* is electrically connected to the second polarity unit 6*e*; and wherein, when the electric current is detected by the electric current detection unit 15*b* for a prescribed amount of time, the switching unit 16 causes electrical connection between the power supply unit 6 and the at least one main body switching terminal 12*b* through 12*d* to be switched from a state in which electrical connection is blocked to a state in which electrical connection is made.

First main body detection terminal 12*a* is electrically connected to first polarity unit 6*d* of DC power supply 6, and second main body detection terminal 12*e* is electrically connected to second polarity unit 6*e* of DC power supply 6. As a result, even if electrical connection were to be made between first and second main body detection terminals 12*a*, 12*e* due to presence of fluid, although electric current would flow momentarily between first and second main body detection terminals 12*a*, 12*e*, it would not flow continuously.

To address this, it is when electric current detection unit 15*b* detects electric current for a prescribed amount of time that electrical connection between power supply unit 6 and at least one of first main body switching terminals 12*b* through 12*d* is switched from a state in which electrical connection is blocked to a state in which electrical connection is made. This will make it possible to suppress occurrence of a situation in which power supply unit 6 might otherwise be erroneously electrically connected to main body switching terminal(s) 12*b* through 12*d.*

Further, as in the present embodiment, it is preferred that the measurement apparatus 2 includes a configuration in which:

wherein the power supply unit 6 is a DC power supply 6 having a first polarity unit 6*d* that is of a first polarity, and a second polarity unit 6*e* that is of a second polarity which is different from the first polarity;

wherein the plurality of main body terminals 12 comprise a plurality of first main body terminals 12*a* through 12*d* that are electrically connected to the first polarity unit 6*d*; and a plurality of second main body terminals 12*e* through 12*g* that are electrically connected to the second polarity unit 6*e;* wherein the main body 5 comprises a base portion 52;

a first retaining portion 57 that is secured to the base portion 52 and that causes the plurality of first main body terminals 12*a* through 12*d* to be retained so as to be separated from the base portion 52; and a second retaining portion 58 that is secured to the base portion 52 and that causes the plurality of second main body terminals 12*e* through 12*g* to be retained so as to be separated from the base portion 52; and wherein the first retaining portion 57 and the second retaining portion 58 respectively protrude upward from the base portion 52.

In accordance with such constitution, because first retaining portion 57 and second retaining portion 58 respectively protrude upward from base portion 52, it will be possible to suppress accumulation of fluid everywhere along the region between base portion 52 and respective retaining portions 57, 58. As a result, it will be possible to suppress accumulation of fluid everywhere along the region between first and second main body terminals 12*a* through 12*d*, 12*e* through 12*g* by way of base portion 52.

Further, as in the present embodiment, it is preferred that the measurement apparatus 2 includes a configuration in which:

wherein the first retaining portion 57 is separated from the second retaining portion 58 so as to cause a region between the first retaining portion 57 and the second retaining portion 58 to be recessed.

In accordance with such constitution, because first retaining portion 57 is separated from second retaining portion 58, the region between first retaining portion 57 and second retaining portion 58 is recessed. As a result, it will be possible to suppress accumulation of fluid everywhere along the region between first and second retaining portions 57, 58. According, it will be possible to suppress accumulation of fluid everywhere along the region between first and second main body terminals 12*a* through 12*d*, 12*e* through 12*g*.

Further, as in the present embodiment, it is preferred that the measurement apparatus 2 includes a configuration in which:

wherein the power supply unit 6 is a DC power supply 6 having a first polarity unit that 6*d* is of a first polarity, and a second polarity unit 6*e* that is of a second polarity which is different from the first polarity;

wherein the plurality of main body terminals 12 comprise a plurality of first main body terminals 12*a* through 12*d* that are electrically connected to the first polarity unit 6*d*; and a plurality of second main body terminals 12*e* through 12*g* that are electrically connected to the second polarity unit 6*e*; and wherein the main body 5 comprises a first retaining portion 57 that retains the plurality of first main body terminals 12*a* through 12*d;* a second retaining portion 58 that is separated from the first retaining portion 57 and that retains the plurality of second main body terminals 12*e* through 12*g*; and a through-hole 52*a* that extends in a vertical direction D3 between the first retaining portion 57 and the second retaining portion 58.

In accordance with such constitution, first retaining portion 57 is separated from second retaining portion 58; and in addition, through-hole 52*a* extends in vertical direction D3 between first and second retaining portions 57, 58. As a result, because fluid between first and second retaining portions 57, 58 will be made to drain therefrom by means of through-hole 52*a*, this will make it possible to suppress accumulation of fluid everywhere along the region between first and second retaining portions 57, 58. According, it will be possible to suppress accumulation of fluid everywhere along the region between first and second main body terminals 12*a* through 12*d*, 12*e* through 12*g*.

Further, as in the present embodiment, it is preferred that the measurement system 1 comprises:

the measurement apparatus 2; and a communication apparatus 3 that is communicated with the measurement apparatus 2.

Such a constitution will make it possible to cause electric power from power supply unit 6 to be supplied to measurement gauge 4 by way of main body 5.

Further, as in the present embodiment, it is preferred that the method for supplying electricity to a measurement apparatus 2 comprising a measurement gauge 4 that measures a fluid, and a main body 5 with respect to which the measurement gauge 4 is removably installable, wherein the measurement gauge 4 comprises a plurality of measurement terminals 11;

wherein the main body 5 comprises a plurality of main body terminals 12 that come in contact with the plurality of measurement terminals 11 when the measurement gauge 4 is installed with respect to the main body 5;

wherein the measurement apparatus 2 comprises:

a power supply unit 6 that supplies electricity to the plurality of main body terminals 12;

a detection unit 15 that detects installation of the measurement gauge 4 with respect to the main body 5; and a switching unit 16 that, when the detection unit 15 detects the installation of the measurement gauge 4 with respect to the main body 5, causes electrical connection between the power supply unit 6 and at least one (first main body switching terminals 12*b* through 12*d* in the present embodiment) of the plurality of main body terminals 12 to be switched from a state in which electrical connection is blocked to a state in which electrical connection is made; and wherein the method for supplying electricity comprises installing the measurement gauge 4 with respect to the main body 5 so as to cause the plurality of measurement terminals 11 and the plurality of main body terminals 12 to come in contact.

Such a method will make it possible to cause electric power from power supply unit 6 to be supplied to measurement gauge 4 by way of main body 5.

The measurement system 1, the measurement apparatus 2 and the method for supplying electricity the measurement apparatus 2 are not limited to the configuration of the embodiment described above, and the effects are not limited to those described above. It goes without saying that the measurement system 1, the measurement apparatus 2 and the method for supplying electricity the measurement apparatus 2 can be variously modified without departing from the scope of the subject matter of the present invention. For example, the constituents, methods, and the like of various modified examples described below may be arbitrarily selected and employed as the constituents, methods, and the like of the embodiments described above, as a matter of course.

(A) The constitution of measurement apparatus 2 associated with the foregoing embodiment is such that detection unit 15 comprises electric current detection unit 15*b* which detects flow of electric current at detection circuit unit 15*a*; and is such that, when electric current is detected by electric current detection unit 15*b*, switching unit 16 causes electrical connection between power supply unit 6 and at least one 12*b* through 12*d* among a plurality of main body terminals 12 to be switched from a state in which electrical connection is blocked to a state in which electrical connection is made. That is, the constitution is such that installation of measurement gauge 4 with respect to main body 5 is detected as a result of detection by detection unit 15 of contact having been made between measurement terminal 11 and main body terminal 12. However, measurement apparatus 2 is not limited to such constitution.

For example, a constitution may be adopted in which detection unit 15 comprises sensor(s) (e.g., optoelectronic sensor(s), proximity sensor(s), contact sensor(s), and/or the like) which detect movement of terminal movable portion(s) 13; and in which, when movement of terminal movable portion(s) 13 is detected by sensor(s), switching unit 16 causes electrical connection between power supply unit 6 and at least one 12*b* through 12*d* among a plurality of main body terminals 12 to be switched from a state in which electrical connection is blocked to a state in which electrical connection is made. This will make it possible for installation of measurement gauge 4 with respect to main body 5 to be detected as a result of detection by detection unit 15 of contact having been made between measurement terminal 11 and main body terminal 12.

Furthermore, for example, a constitution may be adopted in which detection unit 15 comprises protrusion(s) which protrude downward from measurement gauge 4, switch(es) which are arranged at main body 5 and which are pressed on by said protrusion(s), and sensor(s) (e.g., pressure sensor(s), proximity sensor(s), and/or the like) which detect when said switch(es) are pressed on; and in which, when it is detected by sensor(s) that switch(es) are pressed on, switching unit 16 causes electrical connection between power supply unit 6 and at least one 12*b* through 12*d* among a plurality of main body terminals 12 to be switched from a state in which electrical connection is blocked to a state in which electrical connection is made. This will make it possible for installation of measurement gauge 4 with respect to main body 5 to be detected by detection unit 15.

(B) Furthermore, the constitution of measurement apparatus 2 associated with the foregoing embodiment is such that power supply unit 6 is a DC power supply 6 having a first polarity unit 6*d* and a second polarity unit 6*e*. However, measurement apparatus 2 is not limited to such constitution. For example, it is also possible to adopt a constitution in which power supply unit 6 is an AC power supply.

(C) Furthermore, the constitution of measurement apparatus 2 associated with the foregoing embodiment is such that, when electric current detection unit 15*b* detects flow of electric current at detection circuit unit 15*a* for a prescribed amount of time, switching unit 16 causes electrical connection between power supply unit 6 and main body switching terminal(s) 12*b* through 12*d*, 12*f* through 12*g* to be switched from a state in which electrical connection is blocked to a state in which electrical connection is made. However, measurement apparatus 2 is not limited to such constitution.

For example, it is also possible to adopt a constitution in which, immediately upon detection by electric current detection unit 15*b* that electric current is flowing at detection circuit unit 15*a*, switching unit 16 causes electrical connection between power supply unit 6 and at least one 12*b* through 12*d* among a plurality of main body terminals 12 to be switched from a state in which electrical connection is blocked to a state in which electrical connection is made.

(D) Furthermore, the constitution of measurement apparatus 2 associated with the foregoing embodiment is such that retaining portions 57, 58 respectively cause a plurality of main body terminals 12*a* through 12*d*, 12*e* through 12*g* to be retained so as to be separated from base portion 52. However, measurement apparatus 2 is not limited to such constitution. For example, it is also possible to adopt a constitution in which at least one of first and second retaining portions 57, 58 cause a plurality of main body terminals 12*a* through 12*d*, 12*e* through 12*g* to be retained so as to be in contact with base portion 52.

(E) Furthermore, the constitution of measurement apparatus 2 associated with the foregoing embodiment is such that retaining portions 57, 58 respectively protrude upward from base portion 52. However, measurement apparatus 2 is not limited to such constitution. It is also possible to adopt a constitution in which, for example, at least one of first and second retaining portions 57, 58 is recessed in downward fashion from base portion 52, and it is also possible to adopt a constitution in which, for example, it is at the same height (the position in vertical direction D3 is the same) as base portion 52.

(F) Furthermore, the constitution of measurement apparatus 2 associated with the foregoing embodiment is such that first retaining portion 57 is separated from second retaining portion 58. However, measurement apparatus 2 is not limited to such constitution. For example, it is also possible to adopt a constitution in which first retaining portion 57 is in contact with second retaining portion 58.

(G) Furthermore, the constitution of measurement apparatus 2 associated with the foregoing embodiment is such that main body 5 comprises a through-hole 52*a* that extends in vertical direction D3 in a region which is at the interior of sealing portion 53 and which is between first retaining portion 57 and second retaining portion 58. However, measurement apparatus 2 is not limited to such constitution.

For example, it is also possible to adopt a constitution in which main body 5 does not comprise through-hole(s) 52*a* through 52*c* extending in vertical direction D3 at the interior of sealing portion 53. Furthermore, it is also possible to adopt a constitution in which main body 5 is provided with through-hole(s) extending in vertical direction D3 only at location(s) which are at the interior of sealing portion 53 and which are not between first retaining portion 57 and second retaining portion 58.

(H) Furthermore, the constitution of measurement apparatus 2 associated with the foregoing embodiment is such that measurement terminal 11 is arranged above main body terminal 12, and measurement terminal 11 and main body terminal 12 make contact in vertical direction D3. However, measurement apparatus 2 is not limited to such constitution. For example, it is also possible to adopt a constitution in which measurement terminal 11 and main body terminal 12 make contact in horizontal directions D1 and D2.

(I) Furthermore, the constitution of measurement apparatus 2 associated with the foregoing embodiment is such that a plurality of first main body terminals 12*a* through 12*d* are arrayed so as line up in a single row in parallel fashion with respect to second horizontal direction D2, and a plurality of second main body terminals 12*e* through 12*f* are arrayed so as line up in a single row in parallel fashion with respect to second horizontal direction D2, and in adjacent fashion with respect to the plurality of first main body terminals 12*a* through 12*d* so as to line up in a single row together with the plurality of first main body terminals 12*a* through 12*d*. However, measurement apparatus 2 is not limited to such constitution.

For example, it is also possible to adopt a constitution in which a plurality of first main body terminals 12*a* through 12*d* are arrayed so as line up in a single row in parallel fashion with respect to second horizontal direction D2, and a plurality of second main body terminals 12*e* through 12*f* are arrayed so as line up in a single row in parallel fashion with respect to second horizontal direction D2 but so as to be separated in first horizontal direction D1 from the plurality of first main body terminals 12*a* through 12*d*. Furthermore, for example, it is also possible to adopt a constitution in which a plurality of first main body terminals 12*a* through 12*d* are arrayed in annular fashion, and a plurality of second main body terminals 12*e* through 12*f* are arrayed in annular fashion.

(J) Furthermore, the constitution of measurement apparatus 2 associated with the foregoing embodiment is such that that first main body terminal 12*a* which among a plurality of first main body terminals 12*a* through 12*d* is nearest to a plurality of second main body terminals 12*e* through 12*g* is first main body detection terminal 12*a*. However, measurement apparatus 2 is not limited to such constitution. For example, it is also possible to adopt a constitution in which that first main body terminal 12*b* (12*c*, 12*d*) which among a plurality of first main body terminals 12*a* through 12*d* is nearest to a plurality of second main body terminals 12*e* through 12*g* is first main body detection terminal 12*b* (12*c*, 12*d*).

(K) Furthermore, the constitution of measurement apparatus 2 associated with the foregoing embodiment is such that the second main body terminal 12*e* which among a plurality of second main body terminals 12*e* through 12*g* is nearest to a plurality of first main body terminals 12*a* through 12*d* is second main body detection terminal 12*e*. However, measurement apparatus 2 is not limited to such constitution. For example, it is also possible to adopt a constitution in which that second main body terminal 12*f* (12*g*) which among a plurality of second main body terminals 12*e* through 12*g* is nearest to a plurality of first main body terminals 12*a* through 12*d* is second main body detection terminal 12*f* (12*g*).

Thus, it may be that measurement apparatus 2 includes a configuration in which, for example, a plurality of first main body terminals 12*a* through 12*d* are arrayed so as line up in a single row in parallel fashion with respect to horizontal direction D2, a plurality of second main body terminals 12*e* through 12*f* are arrayed so as line up in a single row in parallel fashion with respect to horizontal direction D2, and in adjacent fashion with respect to the plurality of first main body terminals 12*a* through 12*d* so as to line up in a single row together with the plurality of first main body terminals 12*a* through 12*d,* that first main body terminal 12*b* (12*c*, 12*d*) which among a plurality of first main body terminals 12*a* through 12*d* is nearest to a plurality of second main body terminals 12*e* through 12*g* is first main body switching terminal 12*b* (12*c*, 12*d*), and that second main body terminal 12*f* (12*g*) which among a plurality of second main body terminals 12*e* through 12*g* is nearest to a plurality of first main body terminals 12*a* through 12*d* is second main body switching terminal 12*f* (12*g*).

In accordance with such constitution, at least first main body switching terminal 12*b* (12*c*, 12*d*) and second main body switching terminal 12*f* (12*g*) will be arranged between first main body detection terminal 12*a* and second main body detection terminal 12*e*. As a result, because first main body detection terminal 12*a* and second main body detection terminal 12*e* will be separated, it will be possible to suppress unwanted situations such as where, for example, first main body detection terminal 12*a* and second main body detection terminal 12*e* might become electrically connected due to presence of fluid, electrically conductive material, or the like.

(L) Furthermore, the constitution of measurement apparatus 2 associated with the foregoing embodiment is such that, when detection unit 15 detects that measurement gauge 4 has been installed with respect to main body 5, switching unit 16 causes electrical connection between power supply unit 6 and a portion of the plurality of main body terminals 12 (specifically, all of the plurality of main body terminals 12 that are first main body switching terminals 12*b* through 12*d*) to be switched from a state in which electrical connection is blocked to a state in which electrical connection is made. However, measurement apparatus 2 is not limited to such constitution.

For example, it is also possible to adopt a constitution in which, when detection unit 15 detects that measurement gauge 4 has been installed with respect to main body 5, switching unit 16 causes electrical connection between power supply unit 6 and all of the plurality of main body terminals 12 to be switched from a state in which electrical connection is blocked to a state in which electrical connection is made. Furthermore, for example, it is also possible to adopt a constitution in which, when detection unit 15 detects that measurement gauge 4 has been installed with respect to main body 5, switching unit 16 causes electrical connection between power supply unit 6 and all of the plurality of main body terminals 12 that are main body switching terminals 12*b* through 12*d*, 12*f* through 12*g* to be switched from a state in which electrical connection is blocked to a state in which electrical connection is made.

(M) Note that, except where the results of a previous operation is used in a subsequent operation, the order of execution of actions, procedures, steps, stages, and other such respective operations taking place, for example, in the context of the method(s) and apparatus (es) indicated in the claims, specification, and drawings may be implemented in any desired order. Notwithstanding that words such as “first,” “next,” and so forth may have been employed for convenience of description, this should not be understood to imply that execution must be carried out in that order.

The invention claimed is:

1. A measurement apparatus comprising:

a measurement gauge that measures a fluid; and a main body with respect to which the measurement gauge is removably installable;

wherein the measurement gauge comprises a plurality of measurement terminals;

wherein the main body comprises a plurality of main body terminals that come in contact with the plurality of measurement terminals when the measurement gauge is installed with respect to the main body; and wherein the measurement apparatus comprises a power supply unit that supplies electricity to the plurality of main body terminals;

a detection unit that detects installation of the measurement gauge with respect to the main body; and a switching unit that, when the detection unit detects the installation of the measurement gauge with respect to the main body, causes electrical connection between the power supply unit and at least one of the plurality of main body terminals to be switched from a state in which electrical connection is blocked to a state in which electrical connection is made;

wherein the plurality of main body terminals comprise a first main body detection terminal;

a second main body detection terminal, across with which and the first main body detection terminal a voltage from the power supply unit is applied; and at least one main body switching terminal that is connected to the power supply unit by way of the switching unit;

wherein the measurement gauge comprises a first measurement detection terminal that comes in contact with the first main body detection terminal;

a second measurement detection terminal that comes in contact with the second main body detection terminal; and at least one measurement switching terminal that comes in contact with the at least one main body switching terminal;

wherein the detection unit comprises a detection circuit unit that, when the first main body detection terminal and the first measurement detection terminal come in contact and the second main body detection terminal and the second measurement detection terminal come in contact, causes formation of a closed circuit between the first main body detection terminal and the second main body detection terminal; and an electric current detection unit that detects flow of electric current at the detection circuit unit;

wherein, when the electric current is detected by the electric current detection unit, the switching unit causes electrical connection between the power supply unit and the at least one main body switching terminal to be switched from a state in which electrical connection is blocked to a state in which electrical connection is made.

2. The measurement apparatus according to claim 1 wherein the power supply unit is a DC power supply having a first polarity unit that is of a first polarity, and a second polarity unit that is of a second polarity which is different from the first polarity;

wherein the first main body detection terminal is electrically connected to the first polarity unit;

wherein the second main body detection terminal is electrically connected to the second polarity unit; and wherein, when the electric current is detected by the electric current detection unit for a prescribed amount of time, the switching unit causes electrical connection between the power supply unit and the at least one main body switching terminal to be switched from a state in which electrical connection is blocked to a state in which electrical connection is made.

3. The measurement apparatus according to claim 1 wherein the power supply unit is a DC power supply having a first polarity unit that is of a first polarity, and a second polarity unit that is of a second polarity which is different from the first polarity;

wherein the plurality of main body terminals comprise a plurality of first main body terminals that are electrically connected to the first polarity unit; and a plurality of second main body terminals that are electrically connected to the second polarity unit;

wherein the main body comprises a base portion;

a first retaining portion that is secured to the base portion and that causes the plurality of first main body terminals to be retained so as to protrude from the base portion; and a second retaining portion that is secured to the base portion and that causes the plurality of second main body terminals to be retained so as to protrude from the base portion; and wherein the first retaining portion and the second retaining portion respectively protrude upward from the base portion.

4. The measurement apparatus according to claim 3 wherein the first retaining portion is separated from the second retaining portion so as to cause a region between the first retaining portion and the second retaining portion to be recessed.

5. The measurement apparatus according to claim 4 wherein the base portion comprises a through-hole that extends in a vertical direction between the first retaining portion and the second retaining portion.

6. The measurement apparatus according to claim 1 wherein the power supply unit is a DC power supply having a first polarity unit that is of a first polarity, and a second polarity unit that is of a second polarity which is different from the first polarity;

wherein the plurality of main body terminals comprise a plurality of first main body terminals that are electrically connected to the first polarity unit; and a plurality of second main body terminals that are electrically connected to the second polarity unit; and wherein the main body comprises a first retaining portion that retains the plurality of first main body terminals;

a second retaining portion that is separated from the first retaining portion and that retains the plurality of second main body terminals; and a through-hole that extends in a vertical direction between the first retaining portion and the second retaining portion.

7. The measurement apparatus according to claim 1 wherein the main body comprises a base portion;

a retaining portion that is secured to the base portion and that retains the main body terminals; and a sealing portion that is secured to the base portion and that seals the main body terminals and the measurement terminals;

the sealing portion is formed so as to be annular;

the measurement terminals and the retaining portion are arranged at an interior of the sealing portion; and the sealing portion is sandwiched by the base portion and the measurement gauge when the measurement gauge is installed with respect to the main body.

8. The measurement apparatus according to claim 7 wherein the base portion comprises a through-hole that is arranged at the interior of the sealing portion and that extends in a vertical direction.

9. The measurement apparatus according to claim 1 wherein the main body comprises a main body recess that is open to an area above the main body; and the measurement gauge comprises a measurement insertion portion that arranged at the bottom of the measurement gauge and that is inserted into the main body recess.

10. The measurement apparatus according to claim 9 wherein the main body comprises an interlocking portion that is displaced between a locked position at which the measurement insertion portion is abutted on and stopped from above, and an unlocked position at which said abutment and stopping does not occur; and the measurement insertion portion comprises an interlocked portion that is abutted on and stopped by the interlocking portion when the interlocking portion is located in the locked position.

11. The measurement apparatus according to claim 10 wherein the main body comprises a locking force providing portion that exerts an elastic restoring force on the interlocking portion so as to cause the interlocking portion to be located in the locked position.

12. The measurement apparatus according to claim 9 wherein the main body recess comprises a pair of first sandwiching members that sandwich the measurement insertion portion in a first horizontal direction.

13. The measurement apparatus according to claim 12 wherein the measurement insertion portion comprises a first measurement protrusion that protrudes in the first horizontal direction and that comes in contact with one of the first sandwiching members; and a height with which the first measurement protrusion protrudes increases in a vertical direction.

14. The measurement apparatus according to claim 12 wherein the main body comprises a main body protrusion that protrudes in the first horizontal direction and that comes in contact with the measurement insertion portion; and a height with which the main body protrusion protrudes increases in a downward direction.

15. The measurement apparatus according to claim 12 wherein the main body recess comprises a pair of second sandwiching members that sandwich the measurement insertion portion in a second horizontal direction which is perpendicular to the first horizontal direction.

16. The measurement apparatus according to claim 15 wherein the measurement insertion portion comprises a second measurement protrusion that protrudes in the second horizontal direction and that comes in contact with one of the second sandwiching members; and a height with which the second measurement protrusion protrudes increases as one proceeds upward.

17. A measurement system comprising:

the measurement apparatus according to claim 1; and a communication apparatus that communicates with the measurement apparatus.

18. A method for supplying electricity to a measurement apparatus comprising a measurement gauge that measures a fluid, and a main body with respect to which the measurement gauge is removably installable, wherein the measurement gauge comprises a plurality of measurement terminals;

wherein the main body comprises a plurality of main body terminals that come in contact with the plurality of measurement terminals when the measurement gauge is installed with respect to the main body;

wherein the measurement apparatus comprises:

a power supply unit that supplies electricity to the plurality of main body terminals;

a detection unit that detects installation of the measurement gauge with respect to the main body; and a switching unit that, when the detection unit detects the installation of the measurement gauge with respect to the main body, causes electrical connection between the power supply unit and at least one of the plurality of main body terminals to be switched from a state in which electrical connection is blocked to a state in which electrical connection is made; and wherein the method for supplying electricity comprises installing the measurement gauge with respect to the main body so as to cause the plurality of measurement terminals and the plurality of main body terminals to come in contact.

* * * * *